(12) United States Patent
Enomoto et al.

(10) Patent No.: US 8,532,388 B2
(45) Date of Patent: Sep. 10, 2013

(54) IMAGE PROCESSING APPARATUS, IMAGE PROCESSING METHOD, AND COMPUTER PROGRAM

(75) Inventors: Makoto Enomoto, Kawasaki (JP); Tomotoshi Kanatsu, Tokyo (JP); Kitahiro Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 13/299,283

(22) Filed: Nov. 17, 2011

(65) Prior Publication Data

US 2012/0082388 A1 Apr. 5, 2012

Related U.S. Application Data

(63) Continuation of application No. 12/439,994, filed as application No. PCT/JP2008/061788 on Jun. 23, 2008, now Pat. No. 8,077,971.

(30) Foreign Application Priority Data

Jun. 29, 2007 (JP) ................................. 2007-172736

(51) Int. Cl.
*G06K 9/00* (2006.01)
(52) U.S. Cl.
USPC ............................................ 382/181; 382/187
(58) Field of Classification Search
USPC .................. 382/181–231, 232–253
See application file for complete search history.

(56) References Cited

U.S. PATENT DOCUMENTS

| | | | | |
|---|---|---|---|---|
| 5,164,900 A * | 11/1992 | Bernath | ........................ | 715/264 |
| 5,680,479 A | 10/1997 | Wang et al. | | |
| 5,689,620 A | 11/1997 | Kopec et al. | | |
| 5,872,574 A | 2/1999 | Hara et al. | | |
| 5,933,249 A | 8/1999 | Shimura et al. | | |
| 6,006,226 A * | 12/1999 | Cullen et al. | ................... | 382/232 |
| 6,501,475 B1 * | 12/2002 | Cheng | ........................... | 345/467 |

(Continued)

FOREIGN PATENT DOCUMENTS

| | | |
|---|---|---|
| DE | 19522394 A1 | 1/1997 |
| JP | 06-068301 A | 3/1994 |

(Continued)

OTHER PUBLICATIONS

Written Opinion of the International Searching Authority dated Jul. 23, 2008 in corresponding International Application No. PCT/JP2008/061788.

(Continued)

*Primary Examiner* — Alex Liew
(74) *Attorney, Agent, or Firm* — Fitzpatrick, Cella, Harper & Scinto

(57) ABSTRACT

This invention generates a digital document by applying character recognition to character images in a document image, and rendering the character recognition result on the document image in a transparent color. This digital document allows to specify a part corresponding to a search keyword on the document image upon conducting a search. When this digital document is generated, it includes a description required to use glyph data (font data) of a simple character shape commonly to a plurality of character types as font data used upon rendering the character recognition result. Therefore, even when the digital document needs to save font data, an increase in file size can be minimized. Also, by rendering using a simple character shape, the data size of the font data itself can be reduced.

16 Claims, 18 Drawing Sheets

(56) References Cited

U.S. PATENT DOCUMENTS

| | | |
|---|---|---|
| 6,522,330 B2 | 2/2003 | Kobayashi |
| 6,788,810 B2 * | 9/2004 | Fujiwara .................. 382/165 |
| 6,970,601 B1 | 11/2005 | Kaneda et al. |
| 7,133,565 B2 | 11/2006 | Toda et al. |
| 7,310,769 B1 | 12/2007 | Dash |
| 7,349,577 B2 | 3/2008 | Kaneda et al. |
| 7,391,917 B2 | 6/2008 | Ohta et al. |
| 7,519,226 B2 | 4/2009 | Kaneda et al. |
| 7,903,266 B2 | 3/2011 | Arsenault et al. |
| 8,077,971 B2 * | 12/2011 | Enomoto et al. ............. 382/181 |
| 2002/0076111 A1 | 6/2002 | Dance et al. |
| 2003/0123727 A1 | 7/2003 | Kanatsu |
| 2004/0088657 A1 | 5/2004 | Brown et al. |
| 2005/0180645 A1 | 8/2005 | Hasegawa et al. |
| 2006/0045386 A1 | 3/2006 | Fukuoka et al. |
| 2008/0178067 A1 | 7/2008 | Lahman et al. |
| 2009/0154810 A1 | 6/2009 | Enomoto et al. |
| 2010/0232690 A1 | 9/2010 | Kanatsu et al. |

FOREIGN PATENT DOCUMENTS

| | | |
|---|---|---|
| JP | 07-236062 A | 9/1995 |
| JP | 10063776 A | 3/1998 |
| JP | 10-162024 A | 6/1998 |
| JP | 10-289226 A | 10/1998 |
| JP | 11232276 A | 8/1999 |
| JP | 2000-322417 A | 11/2000 |
| JP | 2002-077633 A | 3/2002 |
| JP | 2005-12768 A | 1/2005 |
| JP | 2005259017 A | 9/2005 |
| JP | 2005275863 A | 10/2005 |

OTHER PUBLICATIONS

PCT International Search Report dated Jul. 23, 2008 in corresponding International Application No. PCT/JP2008/061788.

European Search Report dated Jun. 24, 2010 in corresponding European Application No. 08777694.4.

Japanese Office Action dated Oct. 2, 2012, in corresponding Japanese Application No. 2010-193846.

* cited by examiner

F I G. 6

```
<?xml version="1.0"?>
<Document>
```
601

```
  <Page Width="1680" Height="2376" Dpi="200" Number="1">
```
602

```
    <Image X="0" Y="0" Width="1680" Height="2376"
           Date="ACAf49sw89q34rs6dbc23cfasx....a3E52zAD"/>
```
603

```
    <Text X="236" Y="272" Font="Font01" Size="97" Direction="Horizontal"
          Color="0, 0, 0, 255" String="0x2422, 0x2424, 0x2426"
          CWidth="104,96,59", CGlyphId="0, 0, 0"/>
```
604

```
    <Text X="236" Y="472" Font="Font01" Size="92" Direction="Horizontal"
          Color="0, 0, 0, 255" String="0x242b, 0x242d, 0x242f"
          CWidth="113, 101,47", CGlyphId="0, 0, 0"/>
```
605

```
  </Page>
```
606

```
  <Page Width="1680" Height="2376" Dpi="200" Number="2">
```
607

```
    <Image X="0" Y="0" Width="1680" Height="2376"
           Date="sa8OAN2qx7sa23Basd2x......aAqw8D2dDJ"/>
```
608

```
    <Text X="136" Y="872" Font="Font01" Size="92" Direction="Horizontal"
          Color="0, 0, 0, 255" String="0x242b, 0x242d, 0x242f"
          CWidth="113, 101, 47", CGlyphId="0, 0, 0"/>
```
609

```
  </Page>
```
610

```
  <Font Id="Font01">
    <Glyph Id="0" Path="M0, 0 V-1024 H1024 V1024f"/>
  </Font>
```
611

```
</Document>
```
612

FIG. 9

| REGION | x | y | width | height | TYPE |
|---|---|---|---|---|---|
| 1 | 236 | 272 | 260 | 292 | TEXT |
| 2 | 634 | 1264 | 898 | 830 | PHOTO |

| CHARACTER | x | y | width | height | CODE |
|---|---|---|---|---|---|
| 1 | 236 | 272 | 80 | 97 | 0x2422 |
| 2 | 339 | 284 | 79 | 75 | 0x2424 |
| 3 | 434 | 274 | 59 | 95 | 0x2426 |

1102

| CHARACTER | x | y | width | height | CODE |
|---|---|---|---|---|---|
| 1 | 236 | 474 | 87 | 85 | 0x242b |
| 2 | 348 | 472 | 75 | 92 | 0x242d |
| 3 | 448 | 472 | 47 | 89 | 0x242f |

FIG. 12

| No. | CHARACTER CODE | DESCRIPTION POSITION |
|---|---|---|
| 0 | 0x2422 | 1093 |
| 1 | 0x2424 | 1100 |
| 2 | 0x2426 | 1107 |
| 3 | 0x242b | 1250 |
| 4 | 0x242d | 1257 |
| 5 | 0x242f | 1264 |
| 6 | 0x242b | 2601 |
| 7 | 0x242d | 2608 |
| 8 | 0x242f | 2615 |

F I G. 13
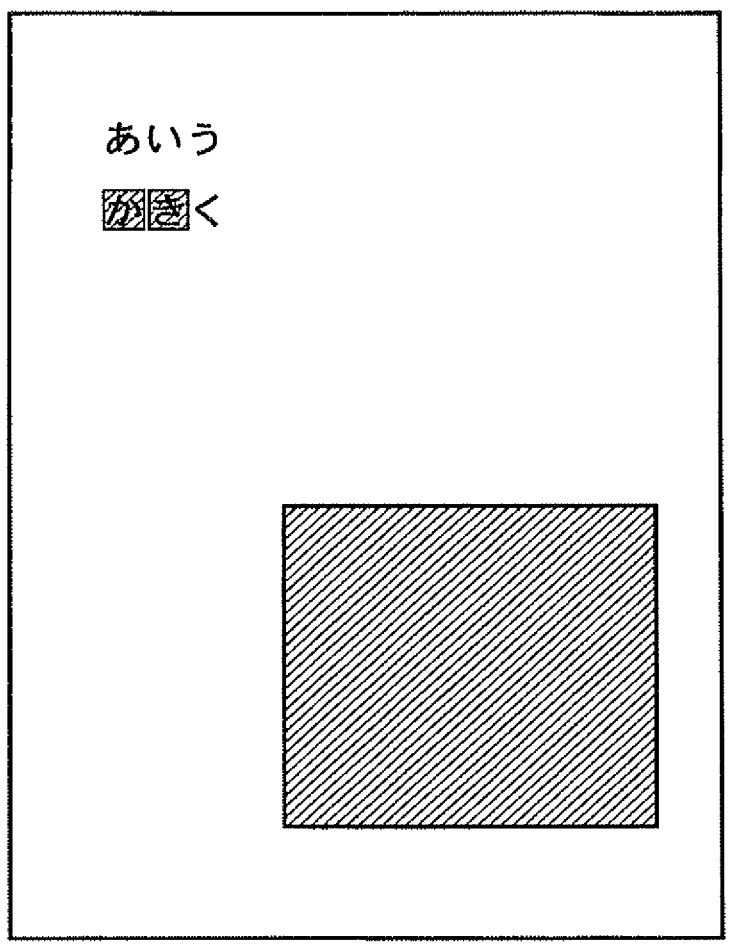

FIG. 14A

```
<?xml version="1.0"?>
<Document>
  <Page Width="1680" Height="2376" Dpi="200" Number="1">
    <Image X="0" Y="0" Width="1680" Height="2376"
        Date="ACAf49sw89q34rs6dbc23cfasx....a3E52zAD"/>
    <Text X="236" Y="368" Font="Font01" Size="10"
        Color="0, 0, 0, 255" String="0x2422, 0x2424, 0x2426"
        CWidth="104, 96, 59", CGlyphId="0, 0, 0"/>
    <Text X="236" Y="563" Font="Font01" Size="10"
        Color="0, 0, 0, 255" String="0x242b, 0x242d, 0x242f"
        CWidth="113, 101, 47", CGlyphId="0, 0, 0"/>
  </Page>
  <Font Id="Font01">
    <Glyph Id="0" Path="M0, 0 V-1024 H1024 V1024f"/>
  </Font>
</Document>
```

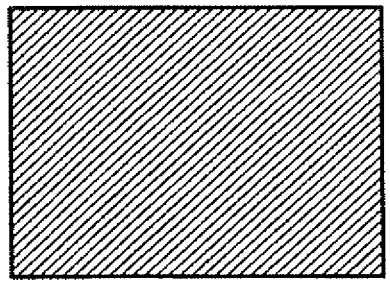

FIG. 15

```
                <?xml version="1.0"?>
1501  {         <Document>

1502  {         <Page Width="1680" Height="2376" Dpi="200" Number="1">
1503  {           <Image X="0" Y="0" Width="1680" Height="2376"
                         Date="ACAf49sw89q34rs6dbc23cfasx....a3E52zAD"/>
                  <Text X="236" Y="272" Font="Font01" Size="97"
1504  {                  Color="0, 0, 0, 255" String="0x2422, 0x2424, 0x2426"
                         CWidth="104,96,59"/>
                  <Text X="236" Y="472" Font="Font01" Size="92"
1505  {                  Color="0, 0, 0, 255" String="0x242b, 0x242d, 0x242f"
                         CWidth="113, 101,47"/>
1506  {         </Page>

1507  {         <Page Width="1680" Height="2376" Dpi="200" Number="2">
1508  {           <Image X="0" Y="0" Width="1680" Height="2376"
                         Date="sa8OAN2qx7sa23Basd2x......aAqw8D2dDJ"/>
                  <Text X="136" Y="872" Font="Font01" Size="92"
1509  {                  Color="0, 0, 0, 255" String="0x242b, 0x242d, 0x242f"
                         CWidth="113, 101, 47"/>
1510  {         </Page>

<Font Id="Font01">
                  <Glyph Id="0x2422" Path="M0, 0 V-1024 H1024 V1024 f"/>
                  <Glyph Id="0x2424" Path="M0, 0 V-1024 H1024 V1024 f"/>
1511  {           <Glyph Id="0x2426" Path="M0, 0 V-1024 H1024 V1024 f"/>
                  <Glyph Id="0x242b" Path="M0, 0 V-1024 H1024 V1024 f"/>
                  <Glyph Id="0x242d" Path="M0, 0 V-1024 H1024 V1024 f"/>
                  <Glyph Id="0x242f" Path="M0, 0 V-1024 H1024 V1024 f"/>
                </Font>

1512  {         </Document>
```

IMAGE PROCESSING APPARATUS, IMAGE PROCESSING METHOD, AND COMPUTER PROGRAM

This application is a continuation of application Ser. No. 12/439,994, filed Mar. 4, 2009, now allowed, which is the National Stage of International Application No. PCT/JP2008/061788, filed Jun. 23, 2008, the contents of which are incorporated by reference herein.

TECHNICAL FIELD

The present invention relates to a technique for converting a scan image of a paper document into digitally searchable data.

BACKGROUND ART

In recent years, since scanners and large-capacity storage devices such as hard disks and the like have prevailed, documents that have been saved as paper are scanned and saved as digital documents. In this case, image data obtained by scanning a paper document undergoes character recognition processing to read text information described in that document, and the text information is saved in association with the image. The user can search digital documents associated with text information using search keywords. In order to search for a desired document fast from large quantities of saved document groups in this way, it is important to allow a keyword search even for scan images.

For example, Japanese Patent Laid-Open No. 2000-322417 describes the following technique. That is, when the user searches for a digital document associated with text information using search keywords, text parts that describe the search keywords on that document image are highlighted to be identifiable for the user. Since the text parts corresponding to the search keywords are highlighted, if the document includes a plurality of description parts of identical keywords, the user can efficiently identify the description parts by switching page images.

On the other hand, a technique that embeds results of character recognition processing in an image file as transparent text (character codes designated with a transparent color as a rendering color) and saving the image file in a PDF (Portable Document Format) format is also available. Upon displaying a PDF file generated in this way, transparent text is rendered on character images in a document image. Therefore, upon conducting a keyword search, transparent text is found, but the user cannot see the transparent text itself, and it seems as if an image were found. In this manner, an image which is searchable using search keywords can be rendered based on a file of a format described using a page description language that allows to render an image and text.

Rendering of text in a digital document using a page description language such as PDF, SVG, or the like requires character shape information of each character, i.e., glyph of font data. However, since font data normally has a large size, it is a common practice not to store font data in a digital document and to only designate font types in the digital document. In this way, an application can render text data using fonts installed in a personal computer.

On the other hand, it is often desired to store font data in a digital document. For example, when a digital document generated by a document generation application is to be opened by another personal computer, if font data used in that digital document are not installed in the personal computer, the digital document cannot be opened accurately. In other words, even when a personal computer or application in which no designated font data are installed reproduces a digital document, if font data themselves are stored in the digital document, that digital document can be accurately reproduced.

In some cases, it is desired to store font data used to render characters in a digital document as an indispensable condition depending on use applications. For example, as for files which are to be saved for long terms, fonts installed as defaults may be changed due to a change in OS after an elapse of a long period of time. Hence, it is desired to store font data as an indispensable format.

Some formats have an indispensable condition to store font data in a digital document. For example, in an XPS (XML Paper Specification) format, font data need to be saved together upon saving text data.

However, when font data are stored in a digital document, the size of the digital document itself increases. When the file size increases, it takes much time to transmit a digital document via a network, or a large storage size is required to store the document.

In this manner, in a digital document of a file format that renders characters using font data stored in the digital document, it is desired to prevent the file size from increasing. Especially, when a scan image, text data as a result of character recognition result, and font data used to render text are stored together in a digital document, it is desired to prevent an increase in file size. When font data need to be stored in a digital document due to restrictions of a format, system, and the like, an increase in file size often readily poses a problem.

DISCLOSURE OF INVENTION

According to the present invention, the foregoing problems are solved by providing an image processing apparatus comprises:

a character recognition unit configured to execute character recognition processing for a plurality of character images in a document image to obtain character codes corresponding to the respective character images; and a generation unit configured to generate a digital document, wherein the digital document includes the document image, a plurality of character codes obtained by the character recognition unit, and glyph data, wherein the glyph data is used commonly to the plurality of character codes when rendering characters corresponding to the plurality of character codes.

Further features of the present invention will become apparent from the following description of exemplary embodiments with reference to the attached drawings.

BRIEF DESCRIPTION OF DRAWINGS

FIG. 6 shows an example of a digital document to be generated according to the first embodiment;

FIG. 9 shows an example of region data to be generated;

FIG. 11 shows an example of character code string data generated based on the character recognition result;

FIG. 12 shows an example of a character code string table;

FIG. 13 shows a display example of a page on which a search result is highlighted;

FIGS. 14A and 14B show a display example of a page on which a search result is highlighted by another highlighting processing;

FIG. 15 shows an example of a digital document generated according to the second embodiment;

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
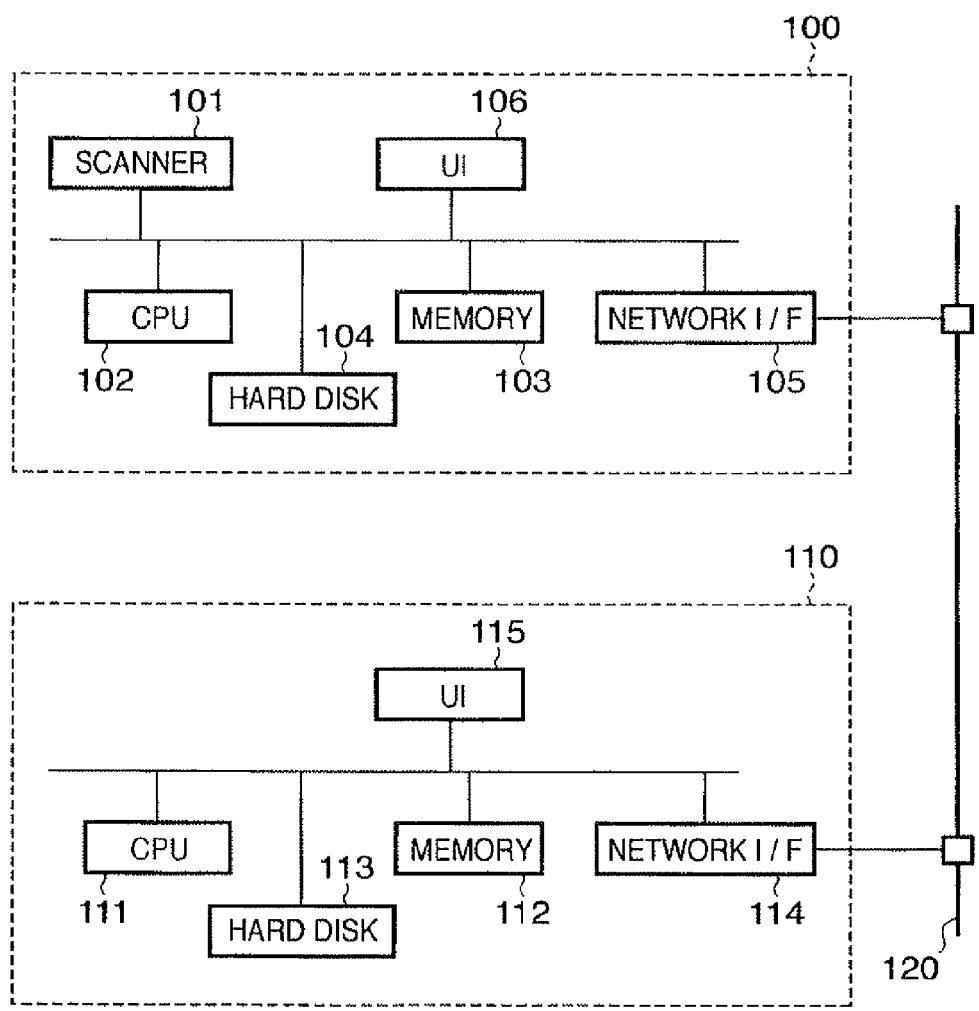
FIG. 1 is a block diagram showing an example of the arrangement of the first embodiment.

FIG. 1 is a block diagram showing an example of the arrangement of an image processing apparatus.

An image processing apparatus 100 is an apparatus for implementing this embodiment, and converts document image data into a searchable digital document. The image processing apparatus 100 comprises a scanner 101, central processing unit (CPU) 102, memory 103, hard disk 104, network interface 105, and user interface (UI) 106. The scanner 101 scans sheet surface information of a paper document, and converts it into document image data. The CPU 102 is a processor which executes computer programs and the like required to analyze image data and to convert it into a searchable digital document. The memory 103 is a storage medium which holds the programs and intermediate data of processing, and is used as a work space of the CPU. The hard disk 104 is a large-capacity storage medium used to store the computer programs and data such as digital documents and the like. The network interface 105 is an interface required to connect a network 120, and is used to transmit data such as a scan image, the converted searchable digital document, and the like to an external apparatus, and to receive data from the external apparatus. The user interface 106 is an interface used to receive instructions from the user, and comprises an input device including input keys, touch panel, and the like, and a display device such as a liquid crystal display, or the like. Note that the arrangement of the apparatus of the present invention is not limited to such specific arrangement.

An image processing apparatus 110 can search for and browse digital documents generated by the image processing apparatus 100. A CPU 111 executes computer programs required to execute processing for searching for and browsing digital documents. A memory 112 is a storage medium which is used as a work space upon execution of the programs, and temporarily saves data. A hard disk 113 is a large-capacity storage medium used to store the computer programs and data such as digital documents and the like. A network interface 114 is an interface used to receive data such as digital documents and the like from an external apparatus, and to transmit data to the external apparatus. A user interface 115 is an interface used to receive instructions from the user, and comprises an input device including input keys, touch panel, and the like, and a display device such as a liquid crystal display, or the like.

The processing of the first embodiment will be described below with reference to the flowcharts shown in FIGS. 2 and 3.

Figure 2:
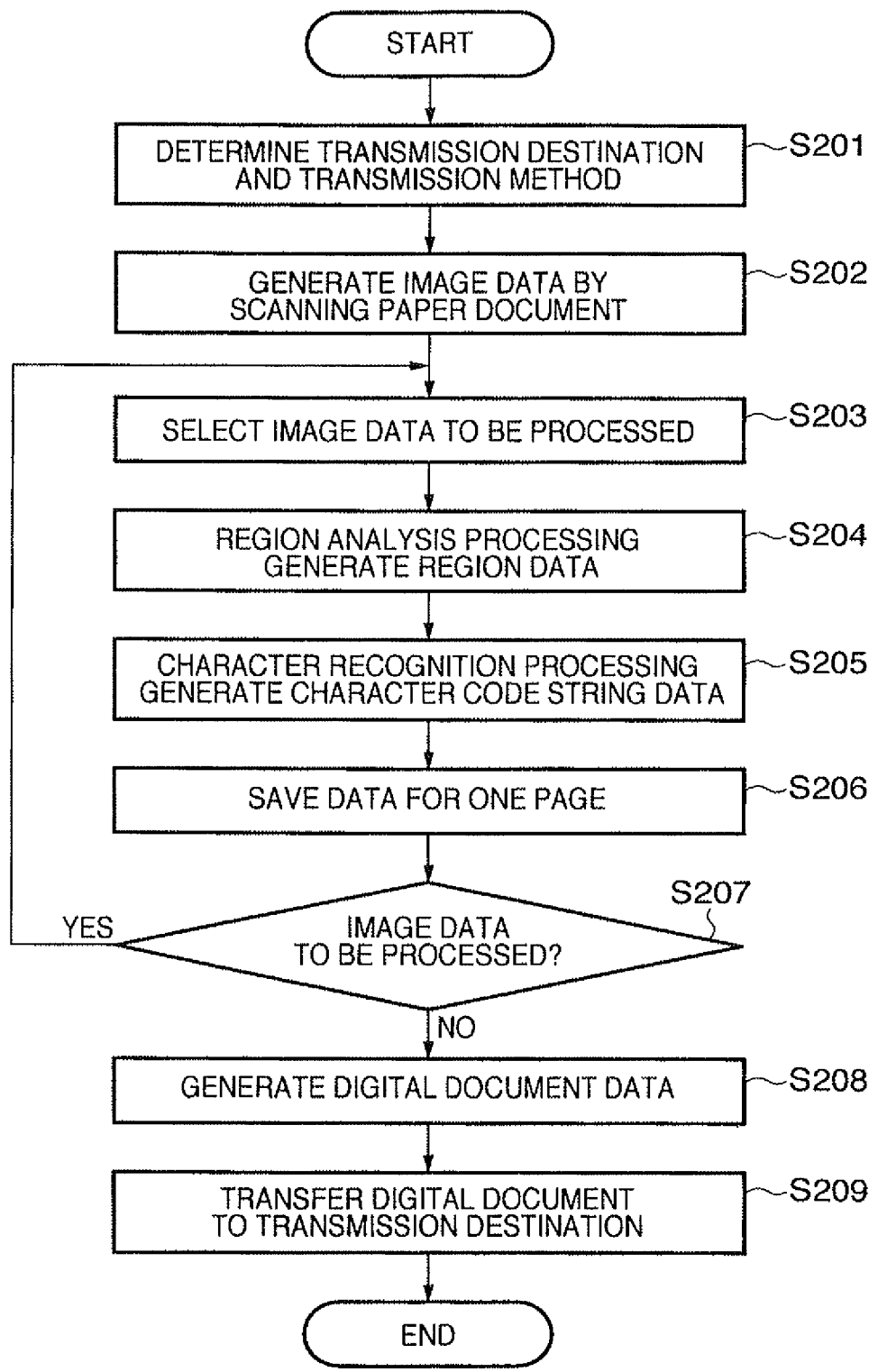
FIG. 2 is a flowchart showing an example of digital document generation processing of the first embodiment.

FIG. 2 is a flowchart showing an example of processing executed when the image processing apparatus 100 generates a searchable digital document based on image data acquired by, e.g., scanning a paper document, and transmits the digital document to the image processing apparatus 110.

In step S201, the CPU 102 determines the transmission destination and transmission method of a digital document to be generated in accordance with a user's instruction operation. The user issues instructions via the user interface 106. The transmission method is selected from choices such as e-mail, file transfer using FTP, and the like.

When the user sets a paper document and presses a start key, the CPU 102 scans the set paper document using the scanner 101 to generate document image data, and saves the document image data in the memory in step S202. When a document including a plurality of pages is input using an auto document feeder or the like, each page is converted into one page image data, and the converted page image data are stored in the memory 103 in their input order.

Figure 7:
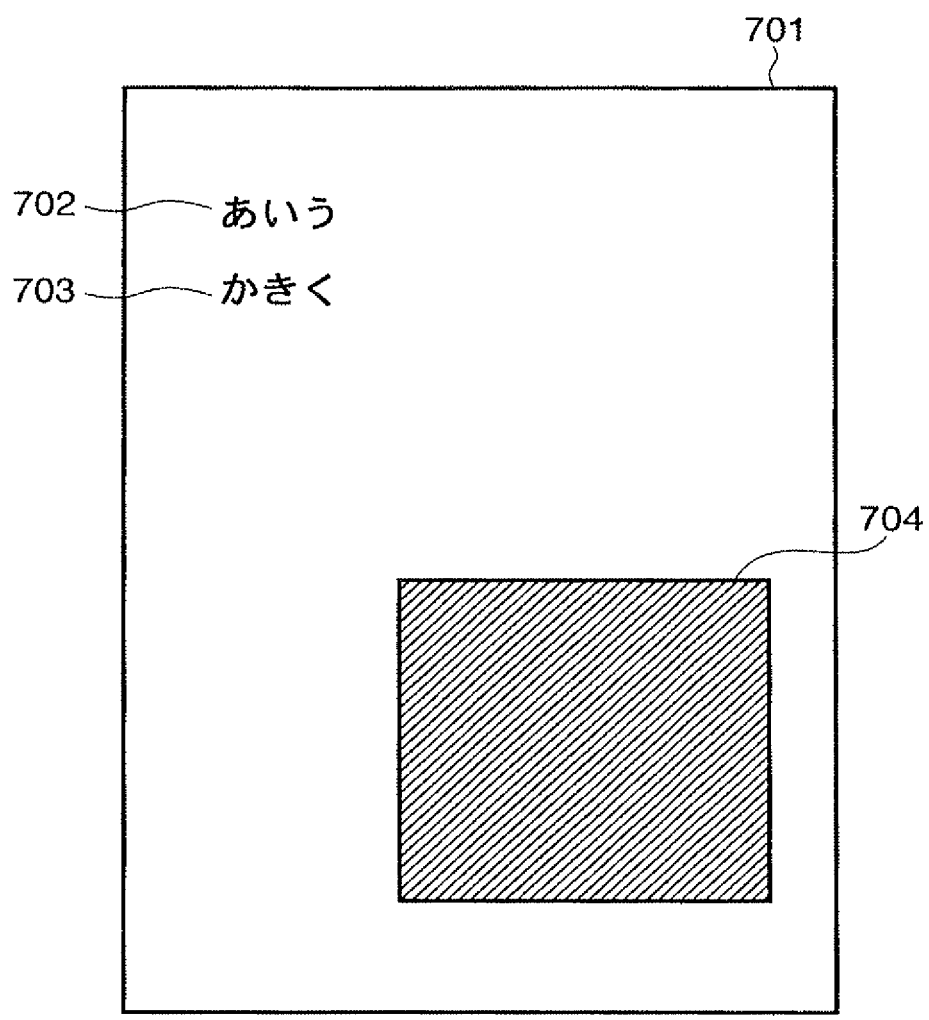
FIG. 7 shows an example of a page image to be processed.
Figure 17:
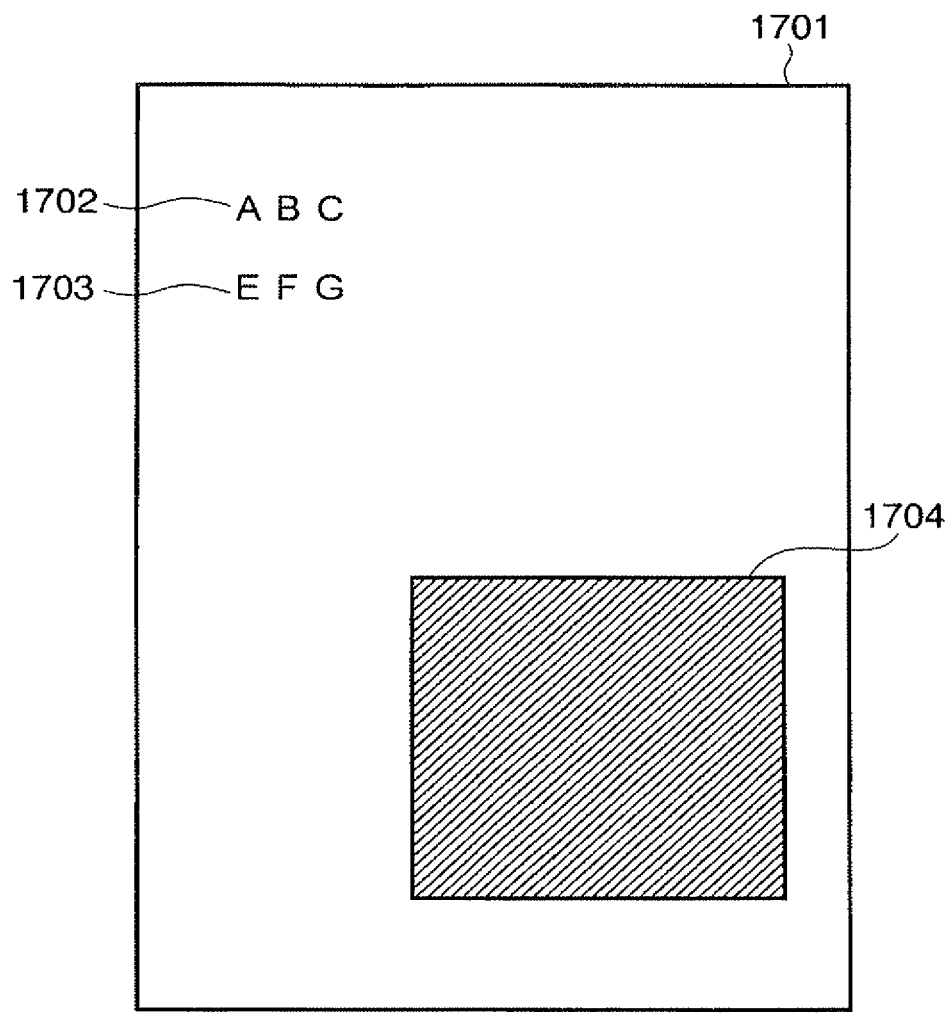
FIG. 17 shows an example of a page image to be processed.

FIG. 7 shows an example of a page image. A page image 701 in FIG. 7 includes a character string "あいう" 702 and a character string "かきく" 703, and a photo 704. Note that the photo 704 is simply illustrated as a solid rectangle for the sake of simplicity, but it is a natural image in practice. In the example of FIG. 7, the page image 701 includes only the character strings 702 and 703 and photo 704, but it may also include a graphics region or the like. The example of FIG. 7 shows Japanese character strings 702 and 703. However, the present invention is not limited to Japanese. For example, alphabetical character strings (English or the like) can also be similarly processed. FIG. 17 shows an example of a document image 1701 including alphabetical character strings 1702 and 1703.

As the format of page image data, for example, when a paper document is a color document, page image data is handled as a color image which expresses tones by 8 bits for each of R, G, and B. When a paper document is a monochrome document, page image data is handled as a gray image which expresses luminance by 8 bits or a binary image which expresses black and white by 1 bit.

In step S203, the CPU 102 selects page image data which is saved in the memory 103 and is not processed yet as an image to be processed. If there are a plurality of pages of images, the CPU 102 selects an image of one page as an image to be processed in accordance with the input order.

In step S204, the CPU 102 executes region analysis processing for analyzing the image to be processed, and identifying regions having different properties such as a text region, graphics region, photo region, table region, and the like to generate region data associated with respective identified regions, and saves the region data in the memory 103. Note that each region data includes the upper left position coordinates (x- and y-coordinate values) of a circumscribed rectangle of that region, the values of the numbers of pixels that represent the size (width and height) of the circumscribed rectangle, and the type of the identified region. Assume that the region analysis processing uses a state-of-the-art technique (also called region identification processing, region discrimination processing, region extraction processing, and the like). For example, when a technique disclosed in Japanese Patent Laid-Open No. 6-68301 is used, a range where black pixel clusters having similar sizes are concatenated vertically or horizontally can be extracted from binary document image data as a text region.

Figure 8:
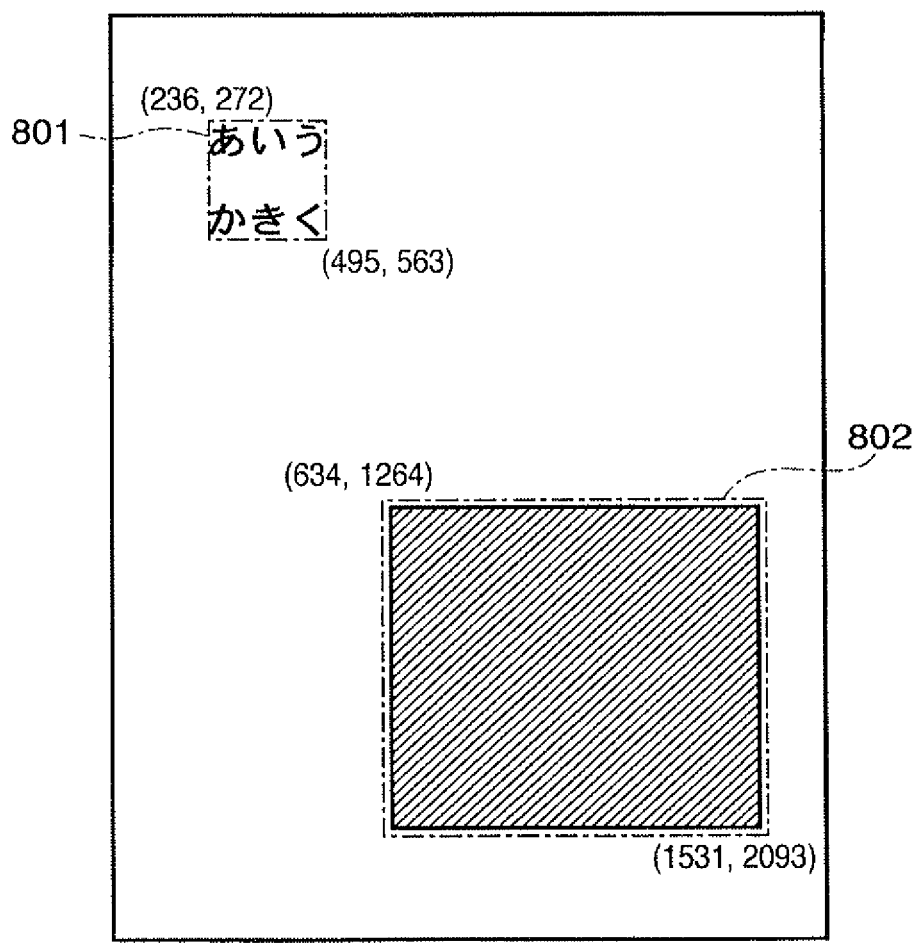
FIG. 8 shows an example of the region segmentation processing result.

As a result of the region analysis processing for the page image 701 shown in FIG. 7, a text region 801 and photo region 802 are identified, as shown in FIG. 8. FIG. 9 shows an example of region data obtained by that region analysis processing. When an image including alphabetical character strings (e.g., the image 1701 in FIG. 17) undergoes the region analysis processing, a region analysis result similar to that of FIG. 7 is obtained.

In step S205, the CPU 102 applies character recognition processing to character images in the text region identified by the region analysis processing to obtain data of character code strings, and saves the obtained data in the memory 103. Assume that data of each character code string includes character code information as a recognition result for each character image included in the text region, and information of a circumscribed rectangle of that character image (information of the upper left coordinates and the width and height of the circumscribed rectangle).

An example of the character recognition processing will be briefly described below. Note that processing for recognizing a character image as a character can use a state-of-the-art technique.

When a document image is not a binary image, a binary image in each text region is obtained by, e.g., binarizing an image in the text region. Histograms are generated by counting the numbers of black pixels for respective vertical and horizontal lines in each binarized text region. Based on the vertical and horizontal histograms, a direction in which periodic histograms appear is defined as a line direction, and a part where the numbers of pixels of the histograms become equal to or larger than a predetermined threshold is defined as a part that forms a character line, thereby obtaining strip-shaped line images. Histograms are calculated for each line image in a direction perpendicular to the line direction, and an image of each character is extracted based on the result of the histograms. This extracted range becomes circumscribed rectangle information of one character. In this case, determination is made using the histograms obtained by counting the numbers of black pixels. Alternatively, each character region may be determined using a projection indicating whether or not each line includes black pixels.

Edge components and the like are extracted from an image in a circumscribed rectangle of each character image so as to obtain a feature vector, and the obtained feature vector is compared with those in a character recognition dictionary, which is registered in advance, thus calculating similarities. A code of a letter type (character type) having the highest similarity is determined as a character code corresponding to the character image in the rectangle. In this way, data obtained by assigning character codes to all the circumscribed rectangles of characters included in the text region are obtained. Then, the character codes obtained from each text region form a character code string.

For English character regions, whether or not an inter-word space exists between neighboring characters is also checked. For example, whether or not a distance between characters is large is checked, and discontinuity of a word is checked by executing matching between a character string of character recognition results of character images and a word dictionary. Hence, whether or not an inter-word space exists can be checked. If it is determined that an inter-word space exists, a character code of that space is inserted into a character code string.

Figure 10:
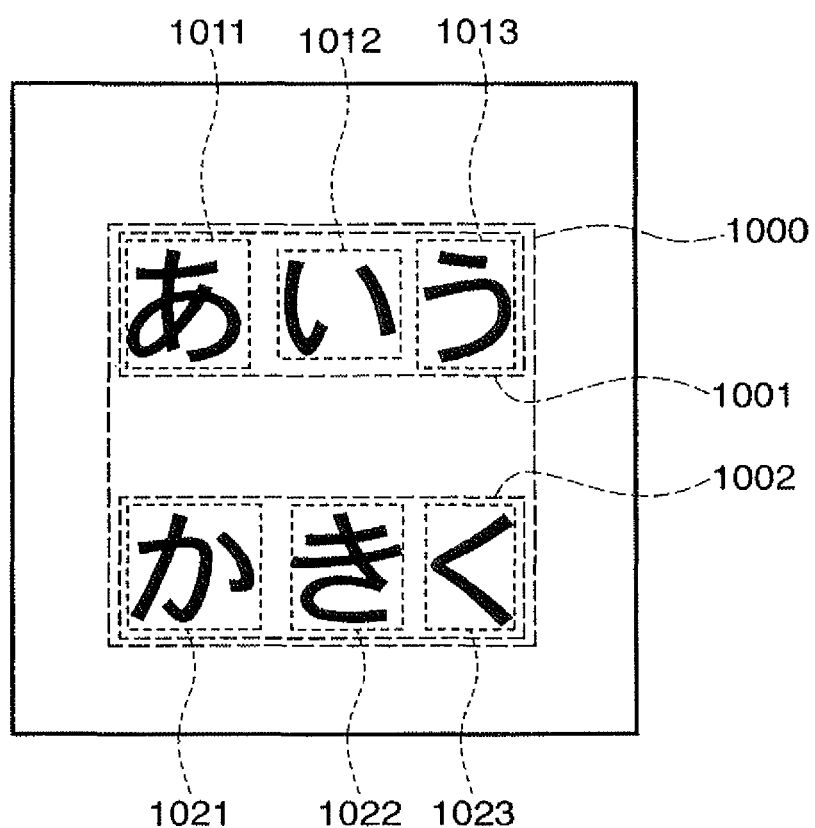
FIG. 10 shows an example of processing executed when character images are to be extracted upon execution of character recognition processing.

FIGS. 10 and 11 show an example of the result of the character recognition processing for the text region 801 shown in FIG. 8. Character lines 1001 and 1002 are extracted from a text region 1000 in FIG. 10. Three characters 1011, 1012, and 1013 are extracted from the character line 1001, and respectively undergo character recognition processing. As a result, character codes corresponding to these characters are obtained, thus generating character code string data 1101 in FIG. 11. Likewise, three characters 1021, 1022, and 1023 extracted from the character line 1002 undergo character recognition processing, thus generating character code string data 1102 in FIG. 11.

Note that the above description is an example, and a character code string may be acquired using processing methods that exploit other known character recognition techniques. FIGS. 10 and 11 show the case in which the Japanese text region undergoes the character recognition processing. However, the present invention is not limited to Japanese. For example, text regions including other languages (e.g., alphabets of English and the like) similarly undergo character recognition processing to obtain character codes.

In step S206, the CPU 102 temporarily saves the page image data to be processed, region data, and character code string data in the memory 103 or hard disk 104 in association with each other.

The CPU 102 checks in step S207 if image data to be processed still remain. If image data to be processed still remain, the process returns to step S203 to process the next page image data. Otherwise, the process advances to step S208.

In step S208, the CPU 102 combines data for all pages saved in the memory 103 or hard disk 104 in the page order to generate a searchable digital document including a plurality of pages.

The data of the digital document generated in step S208 can hold both rendering information required to digitally display each page image on a display or the like or to print each page image by a printer, and content information that allows the user to conduct a search using search keywords. As data formats that meet such conditions, PDF, SVG, and the like are available. However, in this embodiment, assume that it is designated to embed font data as the format of a digital document to be generated. As a format that includes embedding of font data as an indispensable condition, for example, XPS or the like is known. The following description will be given under the assumption of the specification of a page description format using an XML expression. However, the present invention is not limited to such specific format.

FIG. 6 shows a page description example of a digital document generated based on the specification of the page description format used in the description of this embodiment when a document including page images for two pages is input. In this embodiment, as an example of the page description format, descriptions are made together in a single file, as shown in FIG. 6. However, the present invention is not limited to this. For example, the following format (e.g., XPS) may be used. That is, an independent font data file is prepared and is referred to from a main body file, and these files are combined into a single digital document by, e.g., ZIP compression or the like.

Figure 4:
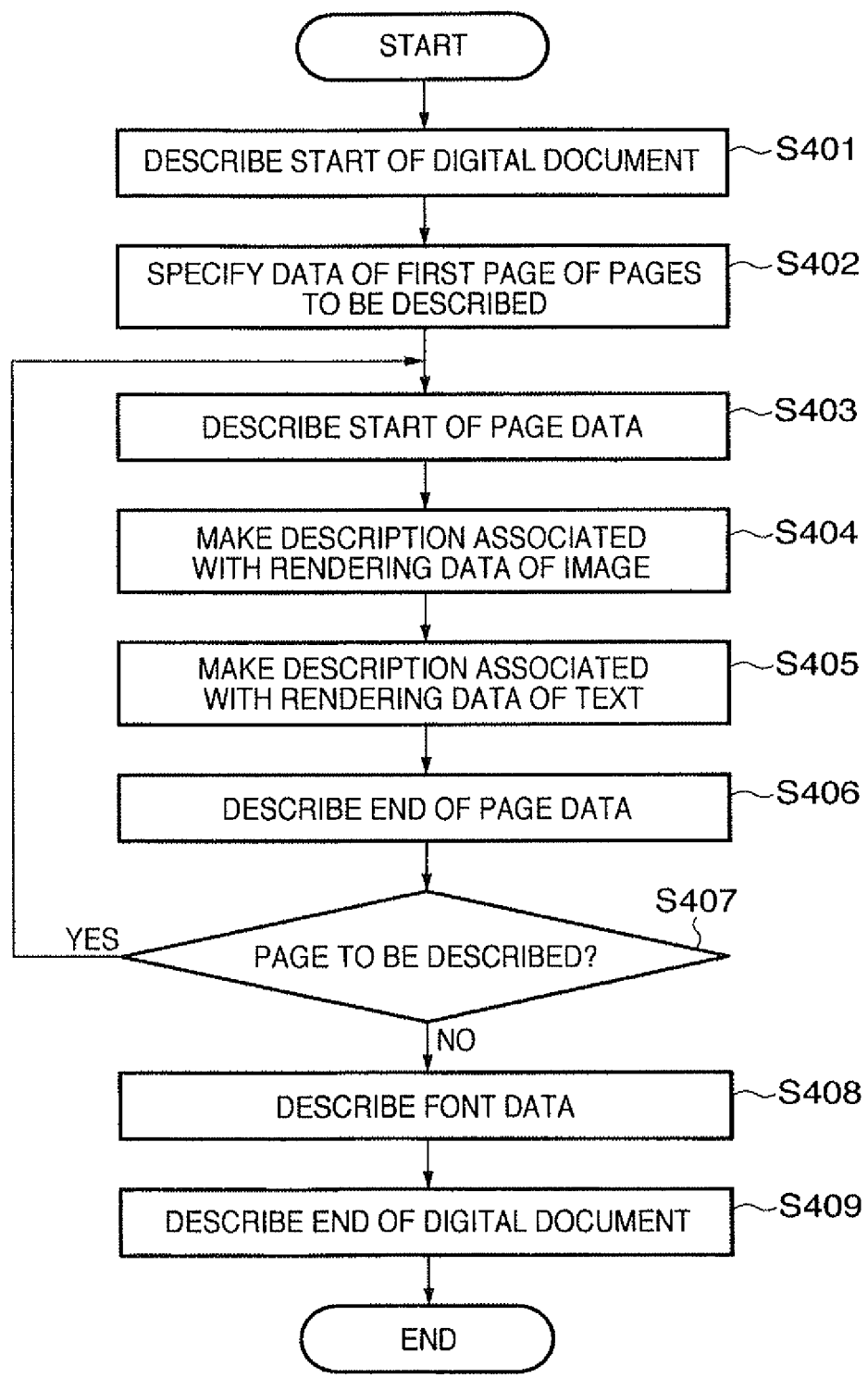
FIG. 4 is a flowchart showing details of digital document data generation processing executed in step S208 in FIG. 2.

An example of the digital document data generation processing executed in step S208 will be described below with reference to the flowchart of FIG. 4.

In step S401, the CPU 102 describes a start tag of a digital document. In the page data description format specification of this description, an element <Document> represents the start tag of the digital document. Note that an XML description within a range bounded by <Document> and </Document> indicating the end of <Document> corresponds description data associated with respective pages included in this document. In the example of FIG. 6, reference numeral 601 denotes a start tag of the digital document; and 612, an end tag.

In step S402, the CPU 102 specifies data associated with the first page of the undescribed pages and defines as data to be processed.

In step S403, the CPU 102 generates and describes a tag that represents the start of the page data to be processed. In this example, an element tag <Page> represents the start of page data, and an XML description within a range bounded by <Page> and </Page> serving as an end tag corresponds to rendering data and content data in this page. The <Page> tag describes a physical size of the page using attributes "Width" and "Height" which indicating the pixel width and height of the page, and an attribute "Dpi" indicating a resolution, and also describes a page number using an attribute "Number" indicating the page number.

In the description example of FIG. 6, a start tag 602 of the <Page> element describes that the width "Width" of the page is "1680", the height "Height" is "2376", the resolution "Dpi" is "200", and the page number "Number" is "1". The data of the first page is described within a range (elements 603 to 606) until an end tag 606.

In step S404, the CPU 102 generates and describes a tag that represents rendering data of an image of those which form the page.

In the page data description format specification of this description, assume that one <Image> element represents rendering data of one image. Also, assume that the contents of image data are described in an attribute "Data", and the rendering position of that image in the page is described using coordinate information of attributes "X", "Y", "Width", and "Height". If the page includes a plurality of images, respective image data are described in a plurality of lines upward in the order of appearance. Note that the attribute "Data" describes the contents of image data in a compressed image data format. As the compression method, a JPEG-compressed code string is used for a color or gray image, or an MMR-compressed code string is used for a binary image.

An element 603 in FIG. 6 defines to render a scan image of the first page of the document on the full page. The element 603 in FIG. 6 describes the position and size of the image as [X="0", Y="0", Width="1680", Height="2376"]. Also, the element describes, as the value of the attribute "Data", a character string of a code string generated by JPEG-compressing an image (the character string of the "Data" attribute is partially omitted in FIG. 6 for the sake of simplicity of the drawing). In this way, the <Image> element 603 is described. Note that the resolution of a scan image may be changed as needed before the scan image is JPEG-compressed and saved (for example, the resolution of an image scanned at 600 dpi may be changed to 300 dpi, and that image may be saved).

In step S405, the CPU 102 generates a description that represents rendering data of characters of those which form the page.

In the page description format specification of this description, one <Text> element represents rendering data of characters for one line. Attribute data described in the <Text> element include "Direction", "X", "Y", "Font", "Size", "Color", "String", "CWidth", "CGlyphId", and the like. Note that the attribute "Direction" indicates whether a character string is written vertically or horizontally. The attributes "X" and "Y" designate the coordinates of a character start position. The attribute "Font" designates an ID of font data required to render a character code. The attribute "Size" designates the font size. The attribute "Color" designates a character color upon rendering using a set of four values, i.e., an R component value, G component value, B component value, and alpha channel value that represents transparency. The attribute "String" designates the contents of a character string (character code string). The attribute "CWidth" designates the character spacing from each character in "String" to the next character. The attribute "CGlyphId" designates IDs of character shape data, i.e., glyphs used upon rendering respective characters in "String". Note that when "Direction" is not designated, horizontal writing is set as a default.

As the character code string that forms each <Text> element, data of the character code strings generated in step S205 in FIG. 2 are further divided and used in correspondence with character lines, i.e., character sets which are concatenated vertically or horizontally.

In the description example of FIG. 6, two <Text> elements 604 and 605 are associated with character rendering descriptions of the first page, i.e., descriptions corresponding to the character code string data 1101 and 1102 in FIG. 11. For example, in the <Text> element 604 corresponding to a horizontally written character string "あいう" including three characters of the data 1101 in FIG. 11, the following attributes are designated.

In the attributes "X" and "Y", X="236" and Y="272" are designated as the upper left coordinates of a circumscribed rectangle for three characters. In the attribute "Direction", "Horizontal" indicating horizontal writing is designated.

In the attribute "Font" indicating the font type, "Font01" is designated. In the attribute "Size" indicating the font size, "97" pixels are designated by analogizing from the heights of characters in the character line. In the attribute "Color" indicating the character color upon rendering, R component value=G component value=B component value=0 and alpha channel=255 are designated (that is, a transparent color is designated).

In the attribute "String" indicating the contents of a character string (a string of character codes corresponding to respective characters), "0x2422, 0x2424, 0x2426" are designated. In the aforementioned example, character codes obtained upon character recognition of the Japanese character string shown in FIG. 7 are described. However, upon character recognition of an English character string in the document image shown in FIG. 17, character codes of alphabets are described. In the attribute "CWidth" indicating the character spacing of respective characters, the coordinate differences between the right neighboring characters and the left end for the first two characters, and a value corresponding to the self character width for the last character, i.e., "104, 96, 59" are designated.

In the attribute "CGlyphId", an ID of a glyph that matches character shape data of each character is normally designated. However, in this embodiment, Since the character shape of a transparent character is rendered on the scan image, the user does not visually confirm it independently of the character shape. Hence, in this embodiment, an identical glyph ID is designated to reduce character shape data (font data) even for different characters. Therefore, in the example of FIG. 6, identical attribute values "0, 0, 0" are described in the attribute "CGlyphId". The character shape designated by this glyph ID can be a simple shape (e.g., a rectangle). Note that details of the glyph shape will be described later.

Note that the above attribute values are merely examples, and may be described using other values having the same meanings. For example, the attribute "Size" indicating the font size may be described using a value such as points or the like in place of the number of pixels, based on the pixel height and image resolution.

In the above example, the upper left coordinate position of the circumscribed rectangle of each character line is designated as a reference, and the font size is designated to match the height of the character line, so that the character string is rendered to be overlaid nearly at the positions of the character images on the scan image. However, the present invention is not limited to this. Especially, since the transparent color is designated for each character to be rendered in this embodiment, and the user does not see it, the character string to be rendered need not be overlaid immediately above the corresponding character images. For example, the transparent character string may be rendered at lower end portions of the corresponding character images. For example, in the example of the element 604 in FIG. 6, if x="236", Y="368", and Size="10" are set, a transparent character string having a small height is rendered at the lower ends of the character images. At this time, the size (height) of the transparent character string to be rendered is set to be a predetermined size (e.g., 10) smaller than the character images.

The transparent character string to be rendered is used upon conducting a search using search keywords later, and a character string that matches the search keyword is highlighted (for example, it is displayed to have a different color). Since the transparent character string is rendered at the position nearly corresponding to those of the corresponding character images, although a search is conducted using the transparent character string, it seems for the user as if the character images were found by the search. Therefore, when the transparent character string is used to highlight characters upon conducting the search, even if it is rendered at the lower ends of the corresponding character images, the corresponding character images are highlighted like they are underlined in case of the search. Hence, no problem is posed. The rendering position of the transparent character string is not limited to the lower end. For example, a description may be made to render the transparent character string at the lower or upper half position of each character image.

In step S406, the CPU 102 describes </Page> indicating the end of the page.

The CPU 102 checks in step S407 if the page to be described still remains. If the page to be described still remains, the process returns to step S403 to have the next page as the page image to be processed. If no page to be described remains, the process advances to step S408.

In the description example of FIG. 6, the CPU 102 executes the processes in steps S404 to S406 for the image of the second page, thereby describing elements 607 to 610.

In step S408, the CPU 102 describes the contents of font data including all glyphs used to render the character strings in this digital document.

In the page data description format specification of this description, glyph data included in the font data is described as a <Glyph> element within a range bounded by <Font> and </Font>. The <Font> element includes an attribute "ID" indicating the type of that font. The <Glyph> element includes an attribute "ID" indicating the type of glyph, and an attribute "Path" indicating a glyph (character shape) corresponding to that ID. Note that the attribute "Path" is described to express the glyph using a line or curve function within a 1024×1024 rendering rectangle unit having a lower left position as an origin.

In the description example of FIG. 6, in a <Font> element 611, a font of Id="Font01" is defined, and one type of glyph of glyph Id="0" is defined in that element. The "Path" attribute "M0,0 V-1024 H1024 V1024 f" indicating the character shape of this glyph describes a glyph which expresses "MOVE to the origin (0, 0), render a 1024 unit vertical line upward, render a 1024 unit horizontal line rightward, render a 1024 unit vertical line downward, and paint a range bounded by rendering lines from the current point to the start point". That is, this attribute has a description that expresses a square glyph obtained by painting a 1024×1024 rectangle.

Note that the description of the <Font> element 611 in FIG. 6 is an example, other simple character shapes such as a triangle, circle, straight line, and the like may be defined, and a blank (space shape) may be defined as a character shape.

In step S409, the CPU 102 describes </Document> indicating the end of the digital document, thus ending generation of the digital document. The generated digital document is saved in the memory 103 or hard disk 104 in the image processing apparatus 100 as a file. Upon saving, the file may be compressed using a known text compression technique.

Referring back to FIG. 2, in step S209 the CPU 102 transmits the digital document generated in step S208 to the transmission designation (e.g., the image processing apparatus 110) by the transmission method, which are designated in step S201. The data transfer processing itself uses a state-of-the-art technique, and a description thereof will not be given.

The image processing apparatus 110 as the transmission destination receives the transferred digital document via the network interface 114, and stores it in the hard disk 113. The data reception processing uses a state-of-the-art technique, and a description thereof will not be given.

Note that arbitrary identification information (file name or the like) may be used to specify a digital document stored in the hard disk of the apparatus. For example, a character string associated with a reception time may be assigned. In addition, non-overlapping numbers may be selected and automatically assigned, or the user may designate such information upon generation of a digital document.

An example of the processing for searching for and browsing digital documents will be described below with reference to the flowchart of FIG. 3. A case will be exemplified below wherein the image processing apparatus 110 conducts a search. However, the present invention is not limited to this, and the image processing apparatus 100 may be designed to conduct a search.

In step S301, the user inputs a search keyword that may be included in text of a desired digital document from the user interface 115 so as to search a digital document group stored in the image processing apparatus 110 for a character string of that digital document. Let k be the length of the input character string.

The CPU 111 checks in step S302 if all digital document files in the hard disk 113 of the image processing apparatus 110 include digital document files which are to undergo the search processing. If such digital document files are included, the CPU 111 specifies one digital document files from them, and decompresses that digital document file if that file is compressed. Then, the process advances to step S303. If there is no digital document which is to undergo the search processing, the process advances to step S312 to notify the user that the search processing for all digital documents is complete.

In step S303, the CPU 111 carries out preparations for conducting a search for text data in the digital document specified in step S302. In this step, the CPU 111 arranges text (character codes) in the document in line, and initializes a search start position n, i.e., sets n=0.

A processing example in step S303 will be described below. The CPU 111 parses the digital document data using an XML parser, and acquires a character code string described in the attribute "String" when a <Text> element appears. The CPU 111 adds a set of a character code and a description position of that character code value in the digital document of each character to a character code string table based on the character code string described in that "String" attribute. The description position of the character code value is the number of characters counted from the head of the digital document data so as to indicate the location of the head of a character string that describes the corresponding character code. FIG. 12 shows an example of the character code string table generated based on the digital document shown in FIG. 6. For example, the three character codes "0x2422", "0x2424", and "0x2426" described in the attribute "String" of the <Text> element 604 in the digital document shown in FIG. 6 are respectively described from the 1093rd, 1100th, and 1107th character positions counted from the head of this digital document. Likewise, the description positions of remaining six character codes are calculated based on the elements 605 and 609 to generate the character code string table shown in FIG. 12. In FIG. 12, a character string number (No.) is assigned in turn from zero.

The CPU 111 checks in step S304 if each character code in the character code string table matches the character code string of the search keyword to have the search start position, n as a start point. If a part that matches the search keyword is detected, the CPU 111 sets the variable n at that time as the head position of a match character string, and the process advances to step S305.

If it is determined in step S304 that no match is found, the process advances to step S309 to check if all characters in the character code string table undergo the search processing. If it is determined that the search processing of all character code strings stored in the character code string table is complete, the process advances to step S311 to notify completion of the search processing of the digital document as the current document which is to undergo the search processing. On the other hand, if it is determined that the search processing of all the character strings is not complete yet, the process advances to step S310 to increment the variable n by 1. The process then returns to step S304 to check if a character code string at the next search start position n in the table matches the search keyword. Note that letting N be the total number of character codes stored in the character code string table, if n<(N−k), it is determined in step S309 that the search processing of all the character code strings is not complete yet; if n≧(N−k), it is determined that the search processing is complete.

For example, upon searching the character code string table in FIG. 12 for a part that matches a search keyword "かき" by scanning a character code string "0x242b" and "0x242d" of that search keyword from the head, the processes in steps S304, S309, and S310 are repeated to extract n=3 as the character string number of the first match character string.

In step S305, the CPU 111 specifies a page of the digital document to which character string data corresponding to the character string number n belongs.

For example, upon parsing the digital document data, if a <Page> element that describes the <Text> element is determined, the CPU 111 can identify the page number based on the "Number" attribute. Therefore, the CPU 111 obtains the description position of the character string corresponding to the position n specified in step S305 from FIG. 12, and specifies a page to which that character string belongs by detecting <Page> elements between which the description position exists. Upon parsing the digital document data in step S303, when the CPU 111 determines <Page> elements which describe respective <Text> elements, and stores them in the character code string table in FIG. 12, it can easily specify the page number based on the character string number. Note that the detection method of a match character string in step S304 and the specifying method of the page number in step S305 are not limited to the aforementioned examples.

In step S306, the CPU 111 renders the page determined in step S305 according to its rendering description, and displays that page on the user interface 115. At this time, upon rendering a character, the character string number (No.) of which falls within a range from n to n+k−1, the CPU 111 renders that characters with a highlight effect so as to allow the user to easily identify a position corresponding to that character. Details of rendering that gives the highlight effect to a part which matches the search keyword will be described below.

The page rendering processing executed in step S306 will be described with reference to the flowchart of FIG. 5.

In step S501, the CPU 111 determines the size of a page image as a rendering result based on the values of the "Width" and "Height" attributes of the <Page> element corresponding to the specified page number.

In step S502, the CPU 111 assures a memory that can store pixel information of the page image.

In step S503, the CPU 111 extracts one of elements to be processed of child elements of the <Page> element, and determines the type of the element to be processed. If it is determined that the element to be processed is <Image>, the process advances to step S504; if it is determined that the element to be processed is <Text>, the process advances to step S505. If all the child elements of the <Page> element have already been processed, the process advances to step S517.

In step S504, the CPU 111 extracts a compressed image described as the "Data" attribute value of the <Image> element. Furthermore, the CPU 111 scales the extracted image to fit a full rendering rectangular region in the page image which is expressed by the attributes "X", "Y", "Width", and "Height", and overwrites that image on the area of the page image memory assured in step S502. After that, the process returns to step S503.

In step S505, the CPU 111 acquires a character start position (X, Y), character font ID (F), character size (S), and character color (C) from the respective attributes described in the <Text> element to be processed. The CPU 111 also acquires the number (N) of characters described in that <Text> element.

In step S506, the CPU 111 assures a memory required to generate a glyph image. In this step, assume that the CPU 111 assures a binary image memory for 1024×1024 pixels.

In step S507, the CPU 111 initializes a counter i indicating a character of interest to "1".

The CPU 111 checks in step S508 if i>N. If i≦N, the process advances to step S509; if i>N, the CPU 111 determines that the processing of that <Text> element is complete, and the process returns to step S503.

In step S509, the CPU 111 acquires a character code (P) of the i-th character from the attribute "String" of the <Text> element, and a glyph ID (Q) of the i-th character from the attribute "CGlyphId".

In step S510, the CPU 111 searches the digital document for a <Font> element description with the font ID=(F), and acquires the "Path" attribute from a <Glyph> element with the glyph ID=(Q) of child elements of that <Font> element description.

In step S511, the CPU 111 generates a glyph binary image on the glyph image generation memory assured in step S506 in accordance with the "Path" attribute value acquired in step S510. Note that the glyph binary image is, for example, an image in which a part to be rendered is expressed as "1", and a part not to be rendered is expressed as "0". Note that the part "1" to be rendered is rendered in a transparent color later.

In step S512, the CPU 111 scales the glyph binary image to have a rectangular size according to the value (S) of the character size attribute.

In step S513, the CPU 111 renders the glyph binary image, which is scaled in step S512, on a rectangular region with reference to the coordinate position (X, Y) in the page image memory. A pixel value of each pixel upon rendering the binary image to be superposed on the page image is defined by the following equation. Assume that each pixel value after the glyph is rendered becomes (r', g', b') with respect to a pixel value (r, g, b) of a page image before the glyph is rendered.

Pixel corresponding to pixel value "0" of glyph binary image: (r', g', b')=(r, g, b)

Pixel corresponding to pixel value "1" of glyph binary image: (r', g', b')=(F(r, Cr), F(g, Cg), F(b, Cb))

where $F(r, Cr)=(r \times A + Cr \times (255-A))/255$, $F(g, Cg)=(g \times A + Cg \times (255-A))/255$, and $F(b, Cb)=(b \times A + Cb \times (255-A))/255$. Also, A is an alpha channel value for the character color C, and Cr, Cg, and Cb are the R, G, and B values of the character color C. When "255" is designated as the alpha channel value, since this glyph binary image is transparent, (r', g', b')=(r, g, b) even for a pixel corresponding to a pixel value "1" of the glyph binary image.

The CPU 111 checks in step S514 using, e.g., the character code string table shown in FIG. 12 if the i-th character of interest is a character, the character string number (No.) of which falls within the range from n to n+k−1. More specifically, since the description start positions of respective characters within the range from n to n+k−1 can be detected from the character code string table, the above checking process is attained based on whether or not the start position of the i-th character of interest matches one of these description start positions. If the i-th character of interest is a character, the character string number of which falls within the range from n to n+k−1, the process advances to step S515; otherwise, the process advances to step S516.

In step S515, the CPU 111 executes highlight processing to indicate that the character of interest falls within the range detected as the search character string. More specifically, pixel values (r, g, b) of pixels within a rectangular range, which corresponds to the range where the character string was rendered and starts from the position (X, Y) of the page image memory, are changed to pixel values (r', g', b') given by:

$$(r',g',b')=(G(r),G(g),G(b))$$

(for $G(r)=255-r, G(g)=255-g, G(b)=255-b$)

Figure 16:
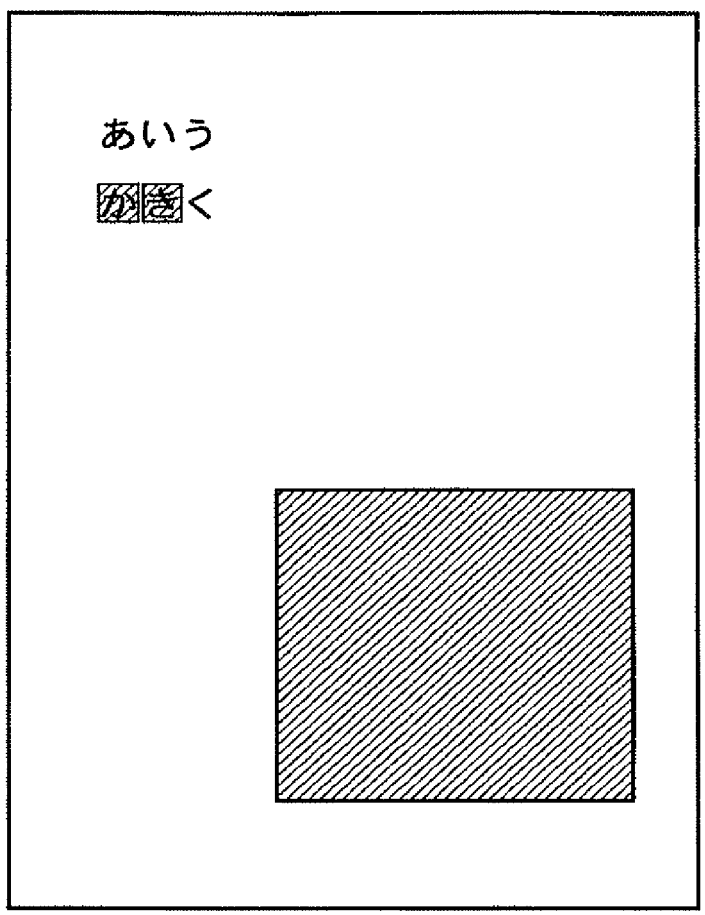
FIG. 16 shows a display example of a page on which a search result is highlighted.

Note that the highlight processing that reverses the color is an example, and other kinds of highlight processing may be used. For example, pixels, which correspond to those with a pixel value "0" of the glyph binary image, may remain unchanged, and pixel values (r, g, b) of pixels, which correspond to those with a pixel value "1" of the glyph binary image, may be changed to (r', g', b') above. Alternatively, using, as the width of the rectangular region to be highlighted, the value of the attribute "CWidth" that designates the space width of characters in place of the width of the glyph binary image, the continuous search character string may be filled without any space. When the highlight processing is executed using the character spacing of characters, a space between the characters is also filled, as shown in FIG. 16.

In step S516, the CPU 111 adds the character spacing (the value of the "CWidth" attribute) of the n-th character to X, and increments n by 1 (n=n+1). The process then returns to step S508.

In step S517, the CPU 111 transfers the rendering result for one page, i.e., the contents of the page image memory on which the <Image> and <Text> element descriptions in the <Page> element are rendered, to a display buffer of the user interface 115, thus displaying the rendering result.

Figure 5:
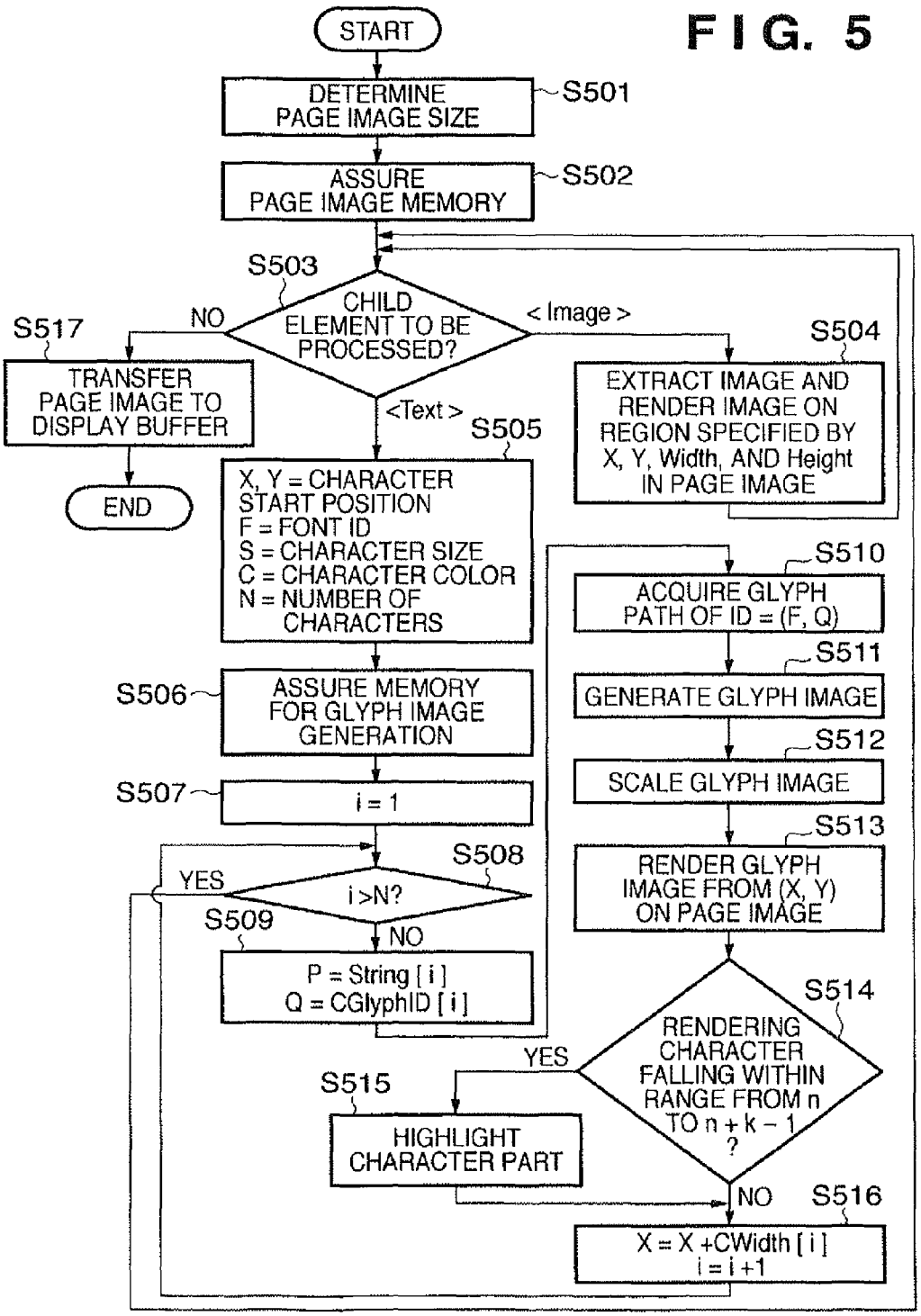
FIG. 5 is a flowchart showing details of page rendering processing executed in step S306 in FIG. 3.

A case will be described below wherein the processing of the flowchart shown in FIG. 5 is executed taking the rendering description of the first page of the digital document shown in FIG. 6 as an example.

By the process in step S501, the CPU 111 determines 1680×2376 pixels as the image size of the page based on the attribute values Width="1680" and Height="2376" of the <Page> element of the first page in FIG. 6.

By the process in step S502, the CPU 111 assures a memory of 1680×2376×3 bytes when, for example, the page image is expressed by RGB 24-bit color.

By the process in step S504, the CPU 111 extracts an image from the compressed code described in the "Data" attribute value of the <Image> element 603 in FIG. 6, and overwrites that image on the entire area of the page image memory. Note that the CPU 111 does not apply scaling processing since the image data has a size of 1680×2376 pixels, which is the same as that of an original page in this example.

By the process in step S505, the CPU 111 acquires X="236", Y="272", the number N of characters="3", character font ID="Font01", character size="97", and character color "0, 0, 0, 255" from the <Text> element 604 in FIG. 6.

By the process in step S509, the CPU 111 acquires the first character code=0x2422 and GlyphId="0" of the "String" attribute of the <Text> element first.

Prior to generation of a glyph binary image in step S511, the CPU 111 acquires "Path" data of the glyph with that ID based on the acquired character font ID="Font01" in step S510. In the example of FIG. 6, the CPU 111 acquires the "Path" attribute of Id="0" in the <Glyph> element included in the <Font> element 611. In step S511, the CPU 111 generates a glyph image based on data of the acquired "Path" attribute of Id="0" of the <Glyph> element. More specifically, the CPU 111 generates an image by filling, by "1", the entire Glyph image area of 1024×1024 pixels in accordance with the description of the "Path" attribute.

Since all "GlyphId" values of characters in the <Text> elements 604 and 605 described in the digital document shown in FIG. 6 are "0", glyph images generated in step S511 for all characters are consequently equal to each other. Therefore, the CPU 111 may temporarily save the glyph image generated in step S511 in a memory, and may use the temporarily saved glyph image upon rendering another character.

In step S512, the CPU 111 scales the glyph character image to 97×97 pixels based on the character size="97".

In step S513, a rectangular range of 97×97 pixels, which starts from the position (X, Y)=(236, 272) on the page image, serves as an area to be rendered by the scaled glyph character image. In the example of FIG. 6, since the character color="0, 0, 0, 255", i.e., the alpha channel value A=255, (r', g', b')=(r, g, b) is always set even when a corresponding pixel value in the glyph binary image is "1". That is, the pixel values in the rectangular region in the page image remain unchanged before and after the process in step S513.

The CPU 111 checks in step S514 based on the character code string table if the first character in the <Text> element 604 in FIG. 6 is a character corresponding to the range from n to n+k−1 of the character string numbers.

Figure 3:
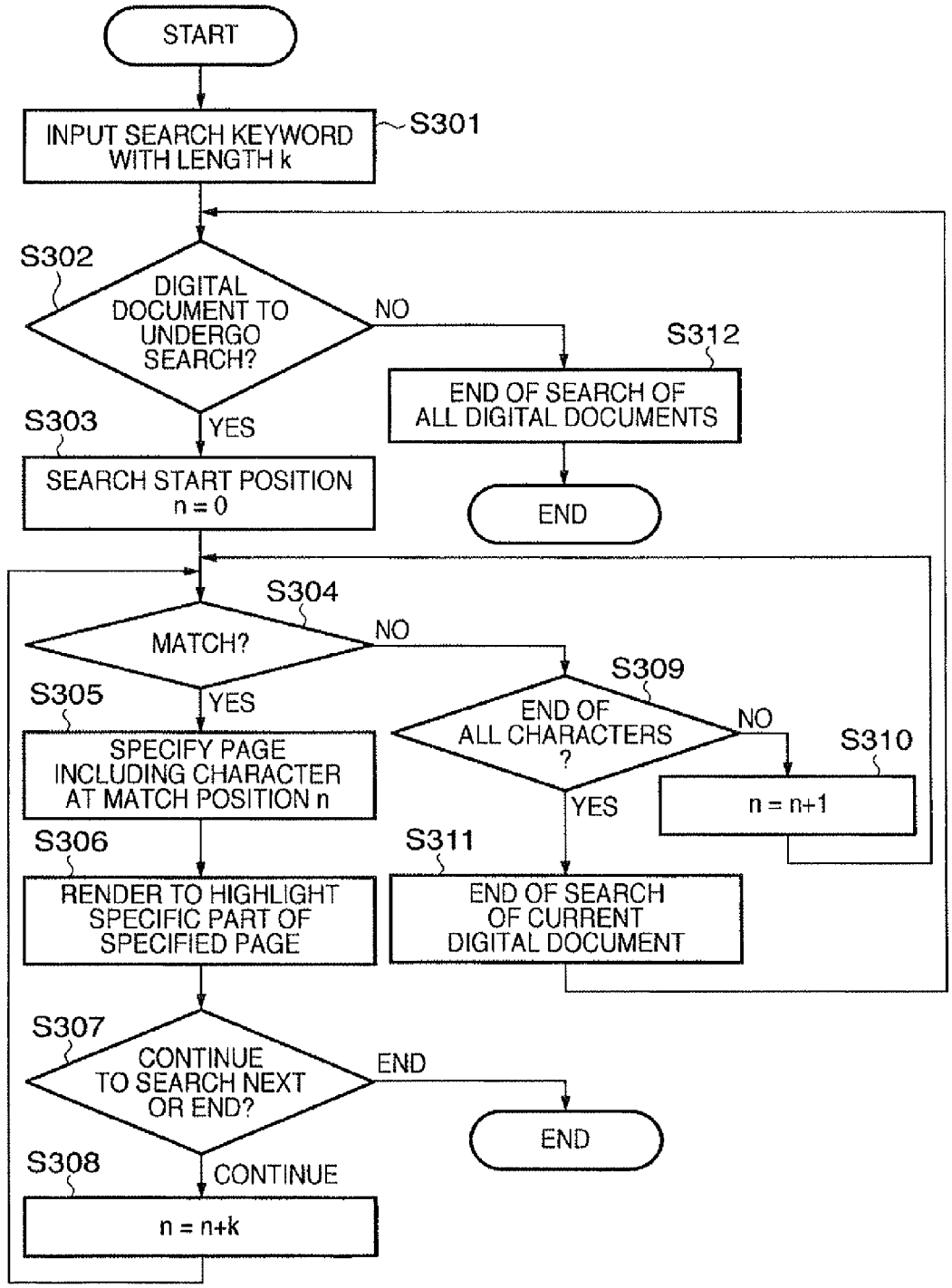
FIG. 3 is a flowchart showing an example of digital document search and browse processing of the first embodiment.

In this case, assume that the character code string table in FIG. 12 is generated based on, e.g., the digital document in FIG. 6, and the range of the character string numbers, which is determined to match the keyword in step S304 in FIG. 3, is 3 and 4. At this time, since the first character code in the <Text> element 604 in FIG. 6 does not fall within the range of 3 and 4, the process advances to step S516. Since the start character position of the first character code description in the <Text> element 604 is 1093, and does not match any of the description positions of the characters within the range of the character string numbers 3 and 4 in the character code string table, it can be determined that the first character of the <Text> element 604 is not a character corresponding to the range of 3 and 4.

After that, upon execution of the processing of the first character in the <Text> element 605 in FIG. 6, it is determined in step S514 that the first character matches the start position of characters within the range of 3 and 4 in the character code string table, and the highlight rendering processing is executed in step S515.

For this character, in step S515 the CPU 111 changes pixel values (r, g, b) within the 92×92 area, which starts from the position (236, 472) of the page image memory, to (G(r), G(g), G(b)).

Figure 18:
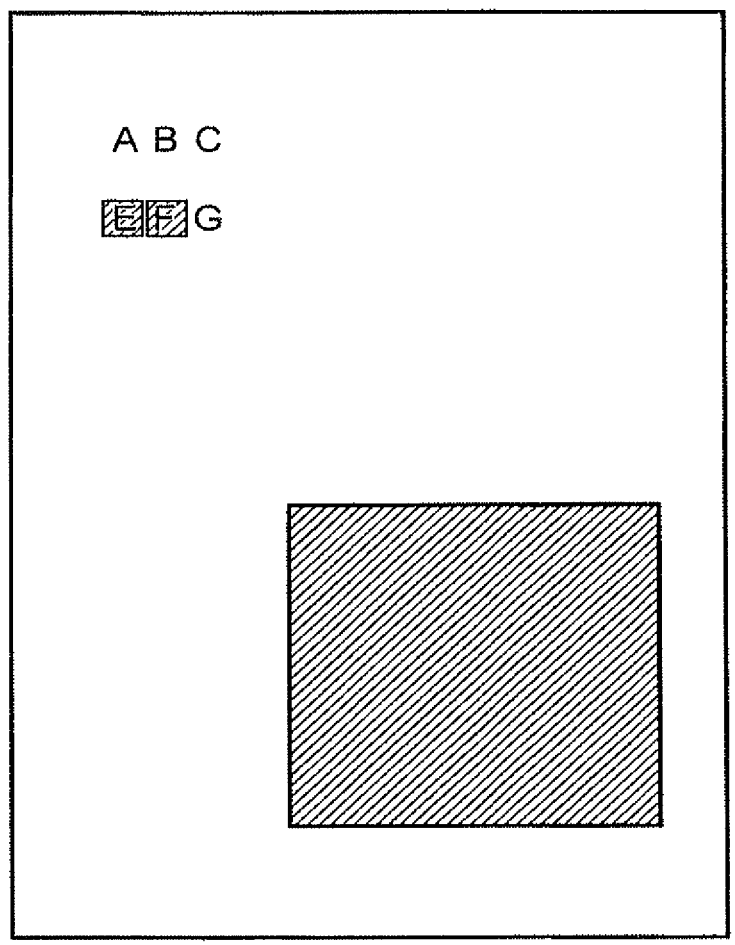
FIG. 18 shows a display example of a page on which a search result is highlighted.

After all the <Text> elements are rendered, as described above, the page image shown in FIG. 13 is obtained. As for the regions corresponding to the characters within the range which is determined to match the keyword in step S304, the luminance values are inverted in each rectangle, and image data rendered by the <Image> element remains unchanged in the regions corresponding to the remaining characters. Note that the case of the Japanese document has been explained in the above example. Also, the same processing is applied to an English document. For example, when the digital document data generation processing shown in FIG. 4 is executed based on the image shown in FIG. 17, digital document data in which the elements 604 and 605 of the digital document in FIG. 6 describe alphabetical character codes is generated. Upon conducting a search for this digital document data using, e.g., a character string "EF", the rendering processing shown in FIG. 5 is executed, and images in rectangular regions corresponding to a found character string are highlighted, as shown in FIG. 18.

In this manner, since the found character string is highlighted, the user can easily determine the position of the search keyword within the page by only observing the image of the page displayed in step S306.

FIGS. 14A and 14B show an example indicating how to display a page image upon adopting the highlight setting by another method. The page rendering description in FIG. 14A describes that a transparent character with a size (e.g., Size="10") smaller than each character image is to be rendered at a position corresponding to the lower portion (lower end) of the corresponding character image upon describing attribute data of the <Text> element in step S405 in FIG. 4. Based on such page rendering description, when a rectangular range of character spacing×character size of each character is to be highlighted in the highlight processing in step S515, a page image, which is highlighted, as shown in FIG. 14B, is generated. In this manner, the user can easily determine the position of the found character string in the page since the found part, which is underlined, seems to be highlighted. Note that FIGS. 14A and 14B show the example of the document image including Japanese character strings, and the same processing can be applied to a document image including English (alphabetical) character strings.

Referring back to FIG. 3, in step S307 the CPU 111 prompts the user to select whether to end the search and browse processing or to continue a search for another search part. If the user selects the end, the processing in FIG. 3 ends; if he or she selects the continuation, the process advances to step S308.

In step S308, the CPU 111 sets n=n+k, and the process returns to step S304 to search for the next part that matches the search keyword.

As described above, according to the first embodiment of the present invention, upon converting a paper document into a digital document, the digital document includes a description required to render characters extracted from a page on a page image in a. transparent color. For this digital document, the user can progress a search while confirming pages on each of which a part that matches a search keyword is highlighted.

This digital document includes font data of one simple character shape (e.g., a rectangle), and is described to render transparent characters of various character types in a document using the simple character shape. That is, one character shape is commonly used for a plurality of character types. Therefore, even when font data used in the digital document is required to be saved in that digital document, the file size (data size) of the digital document can be suppressed.

Second Embodiment

FIG. 15 shows an example of a digital document generated by the second embodiment. As in the first embodiment, assume that an image processing apparatus 100 generates and transmits a digital document, and an image processing apparatus 110 receives, browses, and searches the digital document.

Reference numerals 1501 and 1512 in FIG. 15 denote descriptions that represent the start and end of a digital document. Reference numerals 1502 and 1506 denote descriptions that represent the start and end of rendering of the first page. Reference numeral 1503 denotes a description of image data rendering of the first page. Reference numerals 1504 and 1505 denote descriptions of text rendering of the first page. Reference numerals 1507 and 1510 denote descriptions that represent the start and end of rendering of the second page. Reference numeral 1508 denotes a description of image data rendering of the second page. Reference numeral 1509 denotes a description of text rendering of the second page. Reference numeral 1511 denotes a description of font data used in this digital document.

Since a description of digital document generation processing of the second embodiment is nearly the same as that of the first embodiment using FIGS. 2 and 4, and a description of digital document search and browse processing is nearly the same as that of the first embodiment using FIGS. 3 and 5, differences from the first embodiment will be explained.

<Text> elements 1504, 1505, and 1509 that represent text rendering in FIG. 15 do not describe any attribute "CGlyphId" which designates a glyph ID of each character, and use character codes themselves written in an attribute "CString" in place of the glyph ID of font data 1511.

"Path" data of six character types defined in the font data 1511 define an identical character shape. The font data described in this way can be compressed at a high compression ratio using a known compression technique such as LZ77 or the like.

According to the second embodiment of the present invention, upon converting a paper document into a digital document, the digital document includes a description required to render characters extracted from a page in a transparent color on a page image. For this digital document, the user can progress a search while confirming pages on each of which a part that matches a search keyword is highlighted.

This digital document saves font data configured by the same type of character shape data for respective characters described in the document. Since the font data configured by the same type of character shape data can be compressed at a high compression ratio by a general text compression technique, the second embodiment can also suppress data size of the digital document while holding the font data used in the digital document. In the second embodiment as well, since the character shape described by a glyph is simplified and saved, the data size of the character shape data itself can also be suppressed.

Third Embodiment

The aforementioned embodiments generate a digital document, which describes a full-page image obtained by applying JPEG compression or the like to a scan image in an <Image> element, and describes transparent text in a <Text> element. However, the present invention is not limited to such specific document.

For example, the <Image> element may store MMR-compressed binary images for respective colors of a text region and graphics region, and a JPEG-compressed image of the remaining region in place of the description of a JPEG-compressed image of the entire scan image. As a method of analyzing regions included in a document image, and adaptively applying compression processing, for example, methods described in Japanese Patent Laid-Open No. 07-236062, Japanese Patent Laid-Open No. 2002-077633, and the like can be used. The processing for suppressing the data size of font data used upon rendering transparent text of the present invention, and such image compression processing are combined, thus generating a digital image with a higher compression ratio.

In place of the full-page image, only partial regions such as a text region, graphics region, table region, photo region, and the like may be saved together with their position data.

Fourth Embodiment

In the aforementioned embodiments, a part corresponding to a search result is highlighted by reversing the color (r, g, b) of an image. However, the present invention is not limited to such color to be used. For example, a predetermined color (e.g., yellow) used to specify a search result may be rendered translucently (e.g., alpha channel 128). Alternatively, a highlight color may be determined using the character color (Cr, Cg, Cb).

Fifth Embodiment

In the aforementioned embodiments, upon conducting a search, a character string that matches a keyword is searched in turn from the head of a document, and a character string which is found first is highlighted, as described with reference to FIGS. 3 and 5. Then, if the user inputs a "search next" instruction, the next character string that matches the keyword is searched in turn, and the search result is highlighted. In this way, in the aforementioned embodiments, a character string that matches a search keyword is searched in turn from the head, and a search result is highlighted every time the search keyword hits. However, the present invention is not limited to this. For example, all character strings included in a digital document may be compared with a search keyword specify all character strings that match the keyword, and all these character strings that match the keyword may be highlighted at the same time.

Other Embodiments

Note that the objects of the present invention are also achieved by supplying a computer-readable storage medium, which stores a program code (computer program) of software that implements the functions of the aforementioned embodiments, to a system or apparatus. Also, the objects of the present invention are achieved when a computer (or a CPU or MPU) of the system or apparatus reads out and executes the program code stored in the storage medium.

The computer program of the present invention makes an apparatus execute respective steps described in the aforementioned flowcharts. In other words, this computer program is a program for making a computer function as respective processing units (respective processing means) corresponding to the respective steps of the flowcharts. In this case, the program code itself read out from the computer-readable storage medium implements the functions of the aforementioned embodiments, and the storage medium which stores that program code constitutes the present invention.

As a storage medium for supplying the program code, for example, a flexible disk, hard disk, optical disk, magneto-optical disk, CD-ROM, CD-R, nonvolatile memory card, ROM, and the like can be used.

The present invention also includes a case in which an OS (operating system) or the like running on a computer executes some or all of actual processes based on instructions of the program code, thereby implementing the aforementioned embodiments.

In the first and second embodiments described above, the CPU executes the respective steps of the flowcharts in cooperation with the memory, hard disk, display device, and the like. The present invention is not limited to the aforementioned arrangement, and some or all of the processes of the respective steps described using the flowcharts may be configured by a dedicated electronic circuit in place of the CPU.

According to the present invention, a digital document is generated by applying character recognition to character images in a document image, and rendering the character recognition result on the document image in a transparent color. In this way, the digital document allows to specify a part corresponding to a search keyword on the document image upon conducting a search. When this digital document is generated, it includes a description required to use font data of a simple character shape commonly to a plurality of character types as font data used upon rendering the character recognition result. Therefore, even when the digital document needs to save font data, an increase in file size can be minimized. Also, by rendering using a simple character shape, the data size of the font data itself can be reduced.

Using an identical character shape as font data, the file size can also be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-172736 filed on Jun. 29, 2007, which is hereby incorporated by reference herein in its entirety.

The invention claimed is:

1. An image processing apparatus comprising:
a character recognition unit configured to execute character recognition processing for a plurality of character images in a document image to obtain character codes corresponding to the respective character images; and
a generation unit configured to generate a digital document, wherein the digital document includes the document image, a plurality of character codes obtained by said character recognition unit, glyph data, and a description required to render the glyph data corresponding to the plurality of character codes with a size smaller than sizes of the character images at positions corresponding to the character images in the document image, wherein the glyph data is used commonly to the plurality of character codes when rendering characters corresponding to the plurality of character codes, and wherein a shape indicated by the glyph data does not depend on character shapes of the plurality of character images.

2. The apparatus according to claim 1, wherein the glyph data indicate rectangular shape, blank character shape, triangle shape, circle shape or straight line shape.

3. The apparatus according to claim 1, wherein said generation unit generates the digital document that includes the document image, the plurality of character codes obtained by said character recognition unit, the glyph data, and the description required to render the glyph data corresponding to the plurality of character codes with a size smaller than the sizes of the character images at positions corresponding to the character images in the document image in a transparent color.

4. The apparatus according to claim 1, wherein said generation unit generates the digital document that includes the document image, the plurality of character codes obtained by said character recognition unit, the glyph data, and the description required to render the glyph data corresponding to the plurality of character codes with a size smaller than sizes of the character images at positions corresponding to ends of the character images in the document image.

5. The apparatus according to claim 1, wherein said generation unit generates the digital document that includes the document image, the plurality of character codes obtained by said character recognition unit, the glyph data, and the description required to render the glyph data corresponding to the plurality of character codes with a size smaller than sizes of the character images at lower or upper positions of the character images in the document image.

6. The apparatus according to claim 1, wherein the digital document is a digital document described in an XML format or an XPS format.

7. The apparatus according to claim 1, further comprising a compression unit configured to compress the document image,
wherein the document image included in the generated digital document is a document image which has undergone compression processing by said compression unit.

8. The apparatus according to claim 7, wherein said compression unit analyzes regions included in the document image, and adaptively compresses the regions.

9. The apparatus according to claim 1, further comprising a search unit configured to search the generated digital document using an input keyword, and to highlight a part determined based on rendered glyph data corresponding to character codes that match the keyword.

10. The apparatus according to claim 9, wherein said search unit highlights the part that matches the keyword by reversing a color of that part.

11. The apparatus according to claim 9, wherein said search unit highlights a part determined based on the size of the rendered glyph data and a character spacing size of each character associated with character codes which match the keyword, as the part that matches the keyword.

12. An image processing apparatus comprising:
a character recognition unit configured to execute character recognition processing for a plurality of character images in a document image to obtain character codes corresponding to the respective character images; and
a generation unit configured to generate a digital document, wherein the digital document includes the document image, a plurality of character codes obtained by said character recognition unit, glyph data of an identical shape to be used upon rendering characters corresponding to the plurality of character codes, and a description required to render the glyph data corresponding to the plurality of character codes with a size smaller than sizes of the character images at positions corresponding to the character images in the document image, and wherein a shape indicated by the glyph data does not depend on character shapes of the plurality of character images.

13. An image processing method comprising:
controlling a character recognition unit to execute character recognition processing for a plurality of character images in a document image to obtain character codes corresponding to the respective character images; and
controlling a generation unit to generate a digital document, wherein the digital document includes the document image, a plurality of character codes obtained in the step of controlling a character recognition unit, glyph data, and a description required to render the glyph data corresponding to the plurality of character codes with a size smaller than sizes of the character images at positions corresponding to the character images in the document image, wherein the glyph data is used commonly to the plurality of character codes when rendering characters corresponding to the plurality of character codes, and wherein a shape indicated by the glyph data does not depend on character shapes of the plurality of character images.

14. An image processing method comprising:
controlling a character recognition unit to execute character recognition processing for a plurality of character images in a document image to obtain character codes corresponding to the respective character images; and
controlling a generation unit to generate a digital document, wherein the digital document includes the document image, a plurality of character codes obtained in the step of controlling a character recognition unit, glyph data of an identical shape to be used upon rendering characters corresponding to the plurality of character codes, and a description required to render the glyph data corresponding to the plurality of character codes with a size smaller than sizes of the character images at positions corresponding to the character images in the document image, and wherein a shape indicated by the glyph data does not depend on character shapes of the plurality of character images.

15. A non-transitory computer-readable storage medium retrievably storing a computer program for making a computer execute the steps of:

executing character recognition processing for a plurality of character images in a document image to obtain character codes corresponding to the respective character images; and generating a digital document, wherein the digital document includes the document image, a plurality of character codes obtained in the step of executing character recognition processing, glyph data, and a description required to render the glyph data corresponding to the plurality of character codes with a size smaller than sizes of the character images at positions corresponding to the character images in the document image, wherein the glyph data is used commonly to the plurality of character codes when rendering characters corresponding to the plurality of character codes, and wherein a shape indicated by the glyph data does not depend on character shapes of the plurality of character images.

16. A non-transitory computer-readable storage medium retrievably storing a computer program for making a computer execute the steps of:

executing character recognition processing for a plurality of character images in a document image to obtain character codes corresponding to the respective character images; and generating a digital document, wherein the digital document includes the document image, a plurality of character codes obtained in the step of executing character recognition processing, and glyph data of an identical shape to be used upon rendering characters corresponding to the plurality of character codes, and a description required to render the glyph data corresponding to the plurality of character codes with a size smaller than sizes of the character images at positions corresponding to the character images in the document image, and wherein a shape indicated by the glyph data does not depend on character shapes of the plurality of character images.

* * * * *